(12) United States Patent
Hirabayashi

(10) Patent No.: US 9,146,432 B2
(45) Date of Patent: Sep. 29, 2015

(54) ELECTRO-OPTIC DEVICE HAVING AN ELECTROSTATIC PROTECTION CIRCUIT FOR PROTECTING A GATE DRIVER AND DISPLAY DEVICE THEREOF

(71) Applicant: Japan Display Inc., Tokyo (JP)

(72) Inventor: Yukiya Hirabayashi, Nagano (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 13/657,395

(22) Filed: Oct. 22, 2012

(65) Prior Publication Data

US 2013/0106811 A1  May 2, 2013

(30) Foreign Application Priority Data

Oct. 28, 2011  (JP) .................................. 2011-237489

(51) Int. Cl.
*G06F 3/038* (2013.01)
*G09G 5/00* (2006.01)
*G02F 1/1362* (2006.01)

(52) U.S. Cl.
CPC ................................ *G02F 1/136204* (2013.01)

(58) Field of Classification Search
CPC ....................... G09G 2330/02–2230/12; G09G 2310/0283–2310/0289
USPC ............................................ 345/204, 98–100
See application file for complete search history.

(56) References Cited

U.S. PATENT DOCUMENTS

| | | | |
|---|---|---|---|
| 5,220,443 A * | 6/1993 | Noguchi | 349/40 |
| 2005/0259494 A1* | 11/2005 | Kimura et al. | 365/222 |
| 2007/0030434 A1* | 2/2007 | Hirabayashi et al. | 349/149 |
| 2008/0174577 A1* | 7/2008 | Fujita | 345/204 |

FOREIGN PATENT DOCUMENTS

| | | |
|---|---|---|
| JP | 09-080471 | 3/1997 |
| JP | 2005-275004 | 10/2005 |
| JP | 2007-065615 | 3/2007 |
| JP | 2011-028115 | 2/2011 |
| JP | 2011-100995 | 5/2011 |

OTHER PUBLICATIONS

Japanese Office Action issued Aug. 5, 2014, for corresponding Japanese Appln. No. 2011-237489.

* cited by examiner

*Primary Examiner* — Long D Pham
(74) *Attorney, Agent, or Firm* — K&L Gates LLP

(57) ABSTRACT

An electro-optic device includes: a pixel area having plural pixels; and a frame area formed in a periphery of the pixel area, on an insulating substrate, wherein the frame area includes a drive circuit driving the pixels, a control signal line to which control signals controlling the drive circuit are applied, a common potential electrode having the same potential as a common potential applied to every pixels in common, and an electrostatic protection circuit protecting the drive circuit, and the electrostatic protection circuit includes plural diodes connected in series to each other between the control signal line and the common potential electrode as well as formed by thin-film transistors.

5 Claims, 8 Drawing Sheets

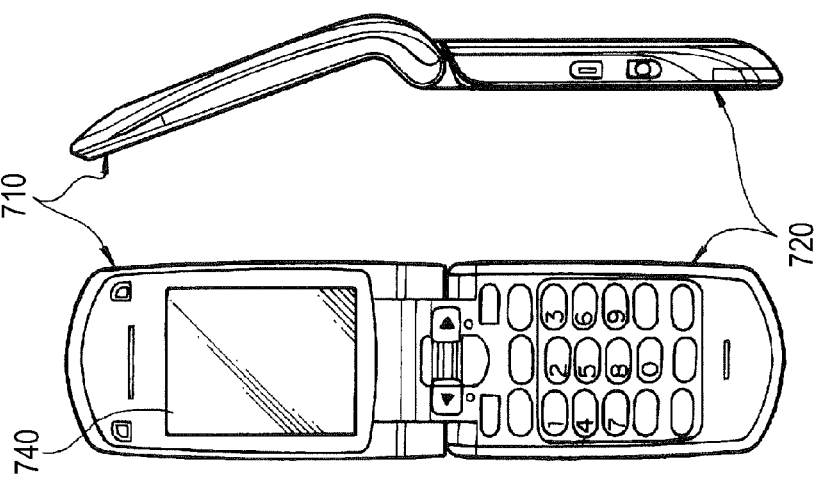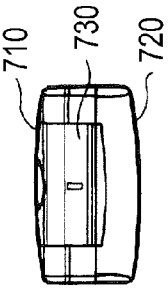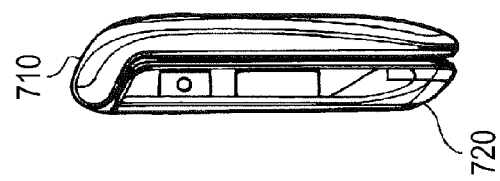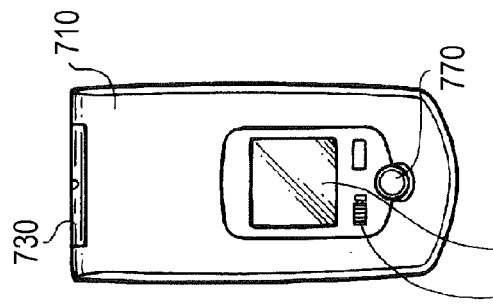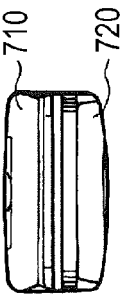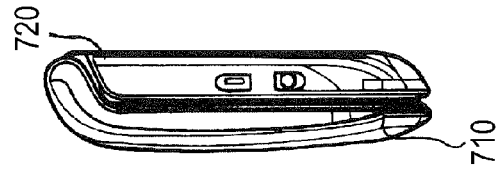

ELECTRO-OPTIC DEVICE HAVING AN ELECTROSTATIC PROTECTION CIRCUIT FOR PROTECTING A GATE DRIVER AND DISPLAY DEVICE THEREOF

CROSS REFERENCES TO RELATED APPLICATIONS

The present application claims priority to Japanese Priority Patent Application JP 2011-237489 filed in the Japan Patent Office on Oct. 28, 2011, the entire content of which is hereby incorporated by reference.

BACKGROUND

The present disclosure relates to an electro-optic device provided with a drive circuit driving pixels on an insulating substrate such as a glass substrate and a display device having the electro-optic device.

In an active-matrix liquid crystal panel, a thin-film transistor (TFT) is used as a switching device in a pixel circuit. The TFTs are formed on the insulating substrate such as the glass substrate with pixel electrodes, signal lines, scanning lines and so on. Recently, a gate driver driving pixels is formed on the insulating substrate in the same process as a manufacturing process of the pixel circuits to thereby reduce manufacturing costs.

When forming the TFTs on the insulating substrate, there may occur electrostatic discharge damage due to electric charge locally accumulated in a subsequent process of the manufacturing process of the TFTs on the insulating substrate or after the shipping of the product. In response to this, an electrostatic protection circuit is provided between the scanning lines connected to the TFTs in the pixel circuits and a large-area common electrode (refer to U.S. Pat. No. 4,039,446 (Patent Document 1)).

SUMMARY

The above electrostatic discharge damage can occur in TFTs in the gate driver. Accordingly, it can be considered that the electrostatic protection circuit is provided, for example between a control signal line connected to the TFTs in the gate driver and the large-area common electrode. In this case, the electrostatic protection circuit provided between the control signal line and the common electrode can be formed in the same configuration as the electrostatic protection circuit provided between the scanning lines and the common electrode. However, when the above configuration is applied, there exists a problem that electrostatic discharge damage tends to occur in the electrostatic protection circuit provided between the scanning lines and the common electrode more frequently than in the electrostatic protection circuit provided in the control signal line and the common electrode. If the electrostatic discharge damage occurs, there is no practical problem when a damage mode is an open-circuit mode. However, the damage mode in the above electrostatic protection circuit is a short-circuit mode in many cases. Accordingly, it is also necessary to reduce the occurrence of a short circuit when electrostatic discharge damage occurs.

In view of the above, it is desirable to provide an electro-optic device provided with an electrostatic protection circuit in which electrostatic discharge damage rarely occurs, and a short circuit rarely occurs in the case where the electrostatic discharge damage occurs, and a display device including the electro-optic device.

An electro-optic device according to an embodiment of the present disclosure includes a pixel area having plural pixels, and a frame area formed in a periphery of the pixel area, on an insulating substrate. The frame area includes a drive circuit driving the pixels, a control signal line to which control signals controlling the drive circuit are applied, a common potential electrode having the same potential as a common potential applied to respective pixels in common and an electrostatic protection circuit protecting the drive circuit. The electrostatic protection circuit includes plural diodes connected in series to each other between the control signal line and the common potential electrode as well as formed by thin-film transistors. A display device according to an embodiment of the present disclosure includes the above electro-optic device as a display panel.

In the electro-optic device and the display device according to the embodiments of the present disclosure, the electrostatic protection circuit including plural diodes connected in series to each other and formed by thin-film transistors is provided between the control signal line to which control signals controlling the drive circuit are applied and the common potential electrode. Accordingly, for example, if one diode is short circuited due to dielectric breakdown, insulation between the control signal line and the common potential electrode is secured by the other diode.

In the electro-optic device and the display device according to the embodiments of the present disclosure, if one diode is short circuited due to dielectric breakdown, insulation between the control signal line and the common potential electrode is secured by the other diode, therefore, occurrence of electrostatic discharge damage can be reduced in the entire electrostatic protection circuit as well as occurrence of a short circuit can be reduced as the entire electrostatic protection circuit when the electrostatic discharge damage occurs.

Additional features and advantages are described herein, and will be apparent from the following Detailed Description and the figures.

BRIEF DESCRIPTION OF THE FIGURES

FIG. 13A is a front view of a fifth application example in an open state, FIG. 13B is a side view thereof, FIG. 13C is a front view thereof in a closed state, FIG. 13D is a left-side view thereof, FIG. 13E is a right-side view thereof, FIG. 13F an upper surface view thereof and FIG. 13G is a bottom view thereof.

DETAILED DESCRIPTION

Hereinafter, an embodiment of the present disclosure will be explained in detail with reference to the drawings. The explanation will be made in the following order.
1. Embodiment
2. Modification Example
3. Application Examples

1. Embodiment

Figure 1:
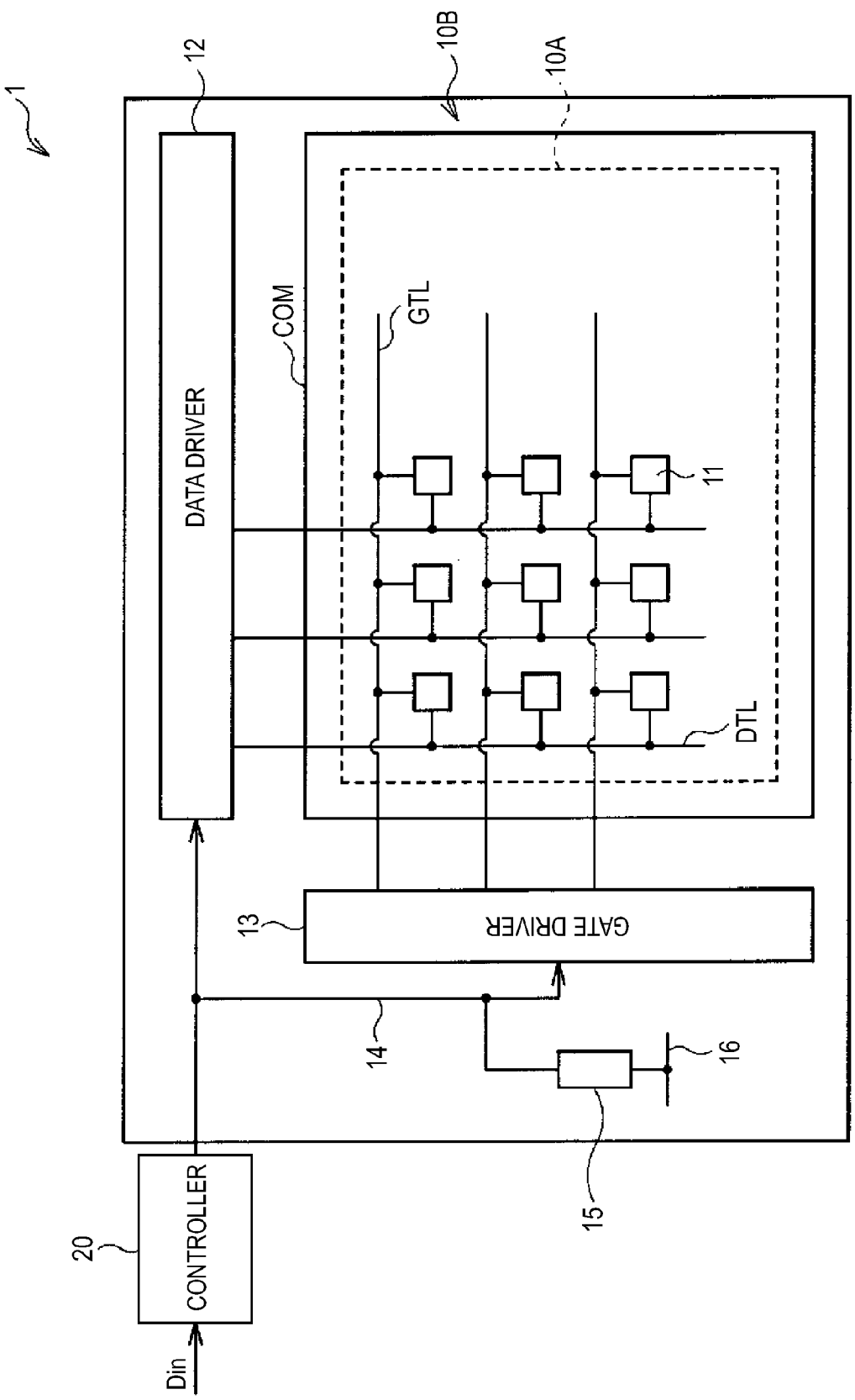
FIG. 1 is a diagram showing an entire configuration of a display device according to an embodiment of the present disclosure.

[Configuration]
FIG. 1 shows an example of an entire configuration of a display device 1 according to an embodiment of the present disclosure. The display device 1 includes a display panel 10 and a controller 20 controlling the display panel 10. The display panel 10 corresponds to a specific example of an "electro-optic device".

The display panel 10 includes a pixel area 10A in which plural pixels 11 are formed in matrix and a frame area 10B formed in a periphery of the pixel area 10A. The frame area 10B includes a data driver 12 and a gate driver 13 as drive circuits driving the pixels 11. The display panel 10 displays images based on video signals Din inputted from the outside by driving every pixels 11 by the data driver 12 and the gate driver 13 in an active matrix drive mode.

Here, the pixel 11 corresponds to a point as the minimum unit forming a screen on the display panel. In the case where the display panel 10 is a color display panel, the pixel 11 corresponds to a sub-pixel emitting light of a single color such as red, green or blue. When the display panel 10 is a monochrome display panel, the pixel 11 corresponds to a pixel emitting while color light. The video signals Din are digital signals of images displayed on the display panel 10 in units of fields, including digital signals for respective pixels 11.

Each pixel 11 includes a liquid crystal layer as a kind of an electro-optic device, a pixel electrode and a counter electrode applying voltages to the liquid crystal layer, and a switching device connected to the pixel electrode. As the switching device, for example, a TFT can be cited. The counter electrode is a sheet-type electrode formed over the entire pixel area 10A, functioning as a common electrode COM used in common by every pixels 11.

The display panel 10 includes plural gate lines GTL extending in a row direction and plural data lines DTL extending in a column direction. The pixels 11 are provided so as to correspond to intersections between the data lines DTL and the gate lines GTL. Each data line DTL is connected to an output terminal (not shown) of the data driver 12 and further connected to, for example, a source or a drain of the TFT in the pixel 11. Each gate line GTL is connected to an output terminal (not shown) of the gate driver 13 and further connected to, for example, a gate of the TFT in the pixel 11. The above described common electrode COM is electrically connected to reference potential lines (not shown) to which a reference voltage (for example, a ground potential) is applied. The reference potential line is one of wiring lines included in a later-described control signal line 14.

The frame area 10B further includes the control signal line 14, a common potential electrode 16 and an electrostatic protection circuit 15 provided between them. The control signal line 14 includes plural wiring lines to which various types of control signals necessary for selective scanning are applied. The control signal line 14 electrically connect the controller 20 to the data driver 12 and the gate driver 13, to which control signals controlling the data driver 12 and the gate driver 13 are applied. The common potential electrode 16 is an electrode having the same potential as a common potential applied to every pixels 11 in common, specifically, an electrode having the same potential as a potential of the common electrode COM. The common potential electrode 16 is formed separately from the common electrode COM and, for example, electrically connected to the common electrode COM through a conductive member of some kind. The common potential electrode 16 is formed over a large area of the frame area 10B as a large-area electrode. The electrostatic protection circuit 15 will be described later in detail.

The controller 20 stores and holds the supplied video signals Din, for example, in a frame memory in units of screens (in units of frames of display). The controller 20, for example, has a function of controlling the data driver 12 and the gate driver 13 driving the display panel 10 to operate in conjunction with each other. The controller 20 supplies, for example, a scan-timing control signal to the gate driver 13 through the control signal line 14. The controller 20 further supplies, for example, image signals for one horizontal line based on the pixel signal stored in the frame memory and a display-timing control signal to the data driver 12 through the control signal line 14.

The data driver 12 supplies, for example, the video signals Din for one horizontal line or corresponding signals supplied from the controller 20 to respective pixels 11. Specifically, the data driver 12 supplies, for example, the video signals Din or corresponding signals to respective pixels 11 included in one horizontal line selected by the gate driver 13 through the data lines DTL, respectively.

The gate driver 13 selectively scans every pixels 11 in units of pixel rows. The gate driver 13 has a function of selecting pixels 11 to be targets of display driving in accordance with, for example, the scan-timing control signal supplied from the controller 20. The gate driver 13 selects one row of plural pixels 11 in the pixel area 10A as a target of display driving by applying a selection pulse to the pixels 11 through the gate line GTL. A display of one horizontal line is performed with these pixels 11 in accordance with the signal supplied from the data driver 12. The gate driver 13 performs, for example, sequential scanning in units of horizontal lines in time sharing manner to perform display all over the pixel area 10A in the above manner.

Figure 2:
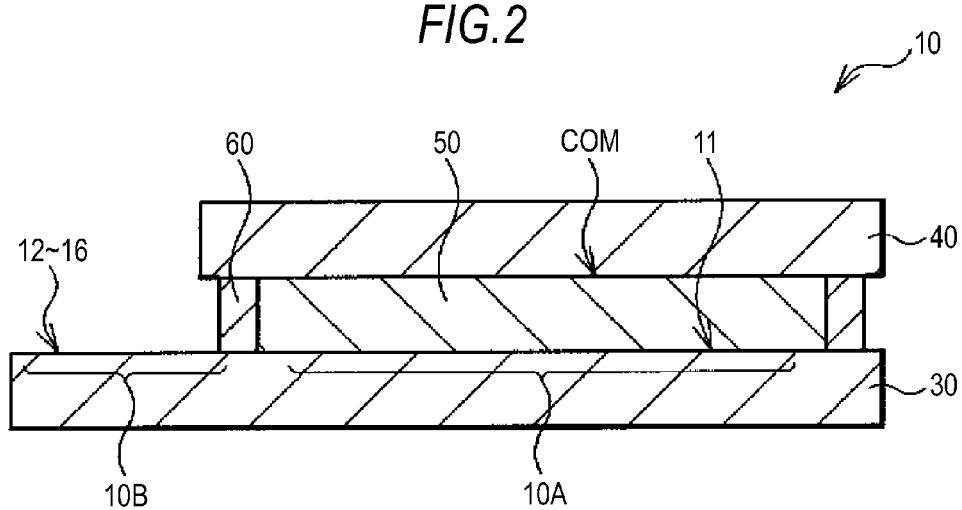
FIG. 2 is a view showing a cross-sectional structure of a display panel of FIG. 1.

Next, a cross-sectional structure of the display panel 10 will be explained. FIG. 2 represents an example of the cross-sectional structure of the display panel 10. The display panel 10 includes a TFT substrate 30, a counter substrate 40, a liquid crystal layer 50 sandwiched between these substrates and a sealant 60 for fixing these substrates through a given gap and for sealing the liquid crystal layer 50. The liquid crystal layer 50 is made of, for example, nematic liquid crystal, and a portion of the liquid crystal layer 50 facing the pixel electrodes corresponds to the electro-optic device.

The TFT substrate 30 includes the pixel area and the frame area formed in the periphery of the pixel area on the insulating substrate such as a glass substrate. In the TFT substrate 30, plural pixels 11, the data driver 12, the gate driver 13, the electrostatic protection circuit 15 and the like are formed on the insulating substrate such as the glass substrate. Also in the TFT substrate 30, the data lines DTL, the gate lines GTL, the control signal line 14, the common potential electrode 16, an alignment film for aligning the liquid crystal layer 50 and the like area formed. The pixel area includes plural pixels 11 and part of the data lines DTL and the gate lines GTL. On the other hand, the frame area includes the data driver 12, the gate driver 13, the control signal line 14, the electrostatic protection circuit 15 and part of the data lines DTL and the gate lines GTL. The counter substrate 40 is arranged in an area facing at least the pixel area 10A of the TFT substrate 30 through a given gap. In the counter substrate 40, the common electrode COM, the alignment film for aligning the liquid crystal layer 50 and so on are formed on, for example, the insulating substrate such as the glass substrate. The counter substrate 40 may include color filters enabling color display in the display panel 10.

Figure 3:
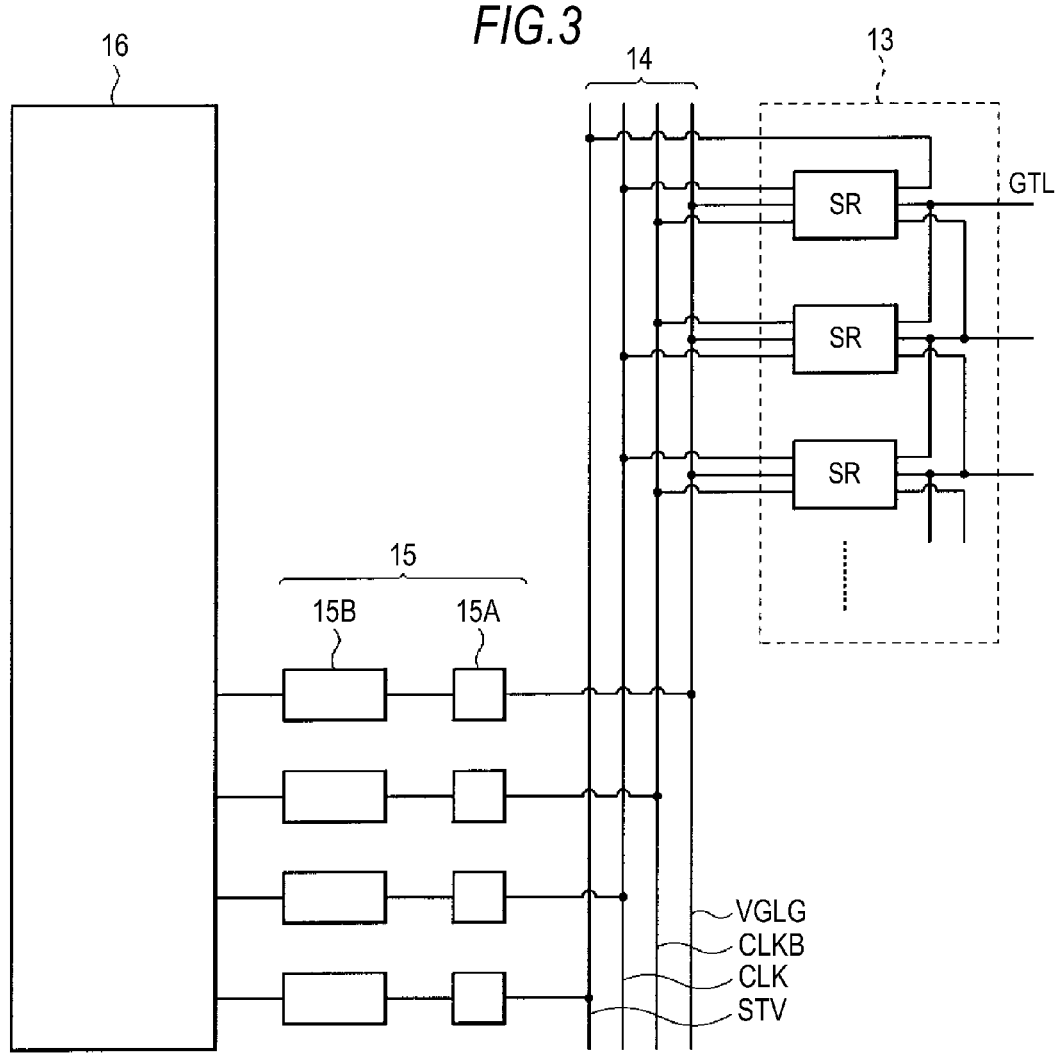
FIG. 3 is a diagram showing a configuration example of an electrostatic protection circuit and a periphery thereof.
Figure 4:
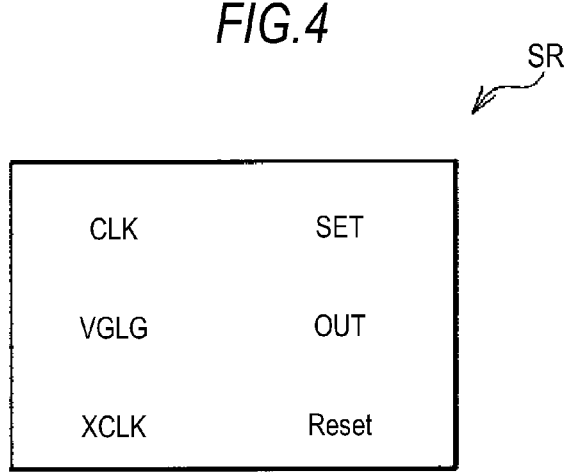
FIG. 4 is a view showing an example of input/output terminals of a shift resister of FIG. 3.
Figure 5:
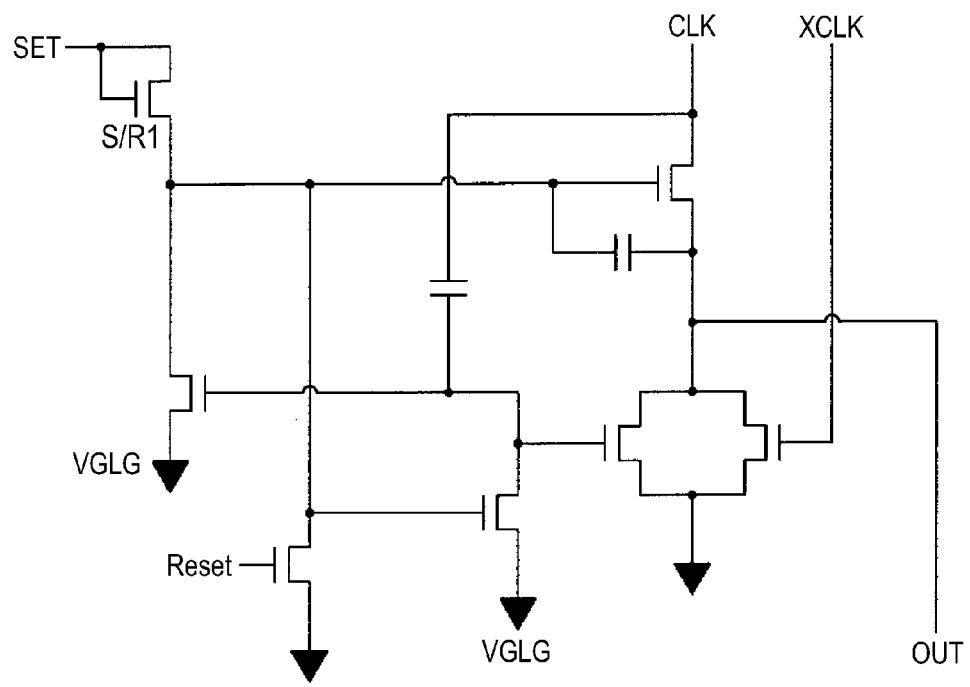
FIG. 5 is a diagram showing an example of a configuration of the shift resister of FIG. 3.

Next, the electrostatic protection circuit 15 will be explained. FIG. 3 shows a configuration example of the electrostatic protection circuit 15 and a periphery thereof. In the periphery of the electrostatic protection circuit 15, for example, the gate driver 13, the control signal line 14 and the common potential electrode 16 are arranged. Here, the gate driver 13 is provided with a common shift register SR, for example, shown in FIG. 4 and FIG. 5 for every pixel row. The control signal line 14 include four wiring lines respectively assigned to CLK, XCLK, VGLG and SET of the shift registers SR.

Figure 6:
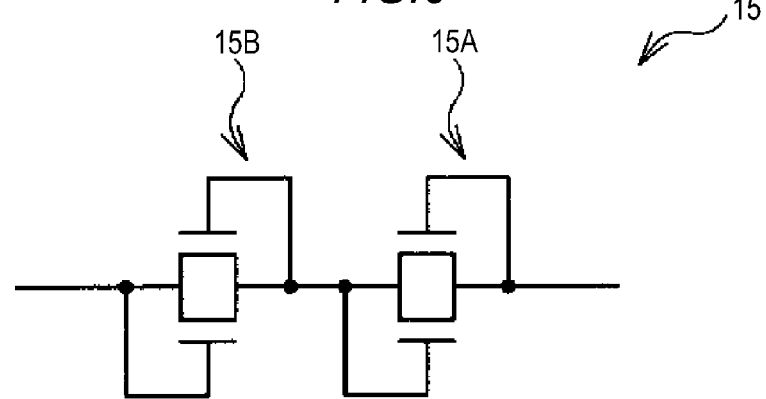
FIG. 6 is a diagram showing an example of a configuration of an electrostatic protection circuit of FIG. 3.

The electrostatic protection circuit 15 protects the gate driver 13 from electrostatic discharge damage, which is disposed between the control signal line 14 and the common potential electrode 16. The electrostatic protection circuit 15 includes plural (two) diodes 15A and 15B connected in series to each other between the control signal line 14 and the common potential electrode 16 as well as formed by TFTs. Here, both the diodes 15A and 15B are in a bi-directional type. In each of the diodes 15A and 15B, for example, two TFTs are connected in parallel as shown in FIG. 6, in which a terminal of source/drain positioned near the gate driver 13 is electrically connected to a gate of one TFT as well as a terminal of source/drain positioned near the common potential electrode 16 is electrically connected to a gate of the other TFT. Accordingly, when large electric charge is accumulated in the control signal line 14 to be a given potential, the electrostatic protection circuit 15 can discharge the accumulated charge to the large-area common potential electrode 16. TFT channel lengths of the diodes 15A and 15B may be equal to each other, but it is preferable that the TFT channel length of the diode 15B positioned near the common potential electrode 16 is longer than the TFT channel length of the diode 15A positioned near the control signal line 14. When applying the configuration, withstand voltage becomes higher in the diode 15B than in the diode 15A and the occurrence of electrostatic discharge damage is reduced, therefore, the possibility of occurrence of electrostatic discharge damage in the diodes 15A and 15B at the same time can be reduced.

The electrostatic protection circuit 15 has a configuration corresponding to the configurations of the gate driver 13 and the control signal line 14 as a matter of form. The electrostatic protection circuit 15 has a configuration corresponding to, for example, the number of wiring lines included in the control signal line 14, in which a pair of diodes connected in series to each other (for example, the diodes 15A and 15B connected in series to each other) is separately provided for every wiring line included in control signal line 14. However, a substantial part in function (relevant part) does not depend on the above specific configuration. For example, the positional relationship of the diodes 15A and 15B with respect to the control signal line 14 and the common potential electrode 16 does not change in a case where the number of wiring lines included in the control signal line 14 is four and in a case where the number of wiring lines is not four.

[Advantages]

Next, advantages of the display device 1 will be explained. In the display device 1, the electrostatic protection circuit 15 including plural diodes 15A and 15B connected in series to each other between the control signal line 14 and the common potential electrode 16 as well as formed by TFTs is provided. Accordingly, for example, even when one diode (for example, the diode 15A) is short circuited due to dielectric breakdown, insulation between the control signal line 14 and the common potential electrode 16 is secured by the other diode (for example, the diode 15B). As a result, the occurrence of electrostatic discharge damage is reduced in the entire electrostatic protection circuit 15, and further, a short circuit rarely occurs in the entire electrostatic protection circuit 15 when electrostatic discharge damage occurs.

2. Modification Example

Figure 7:
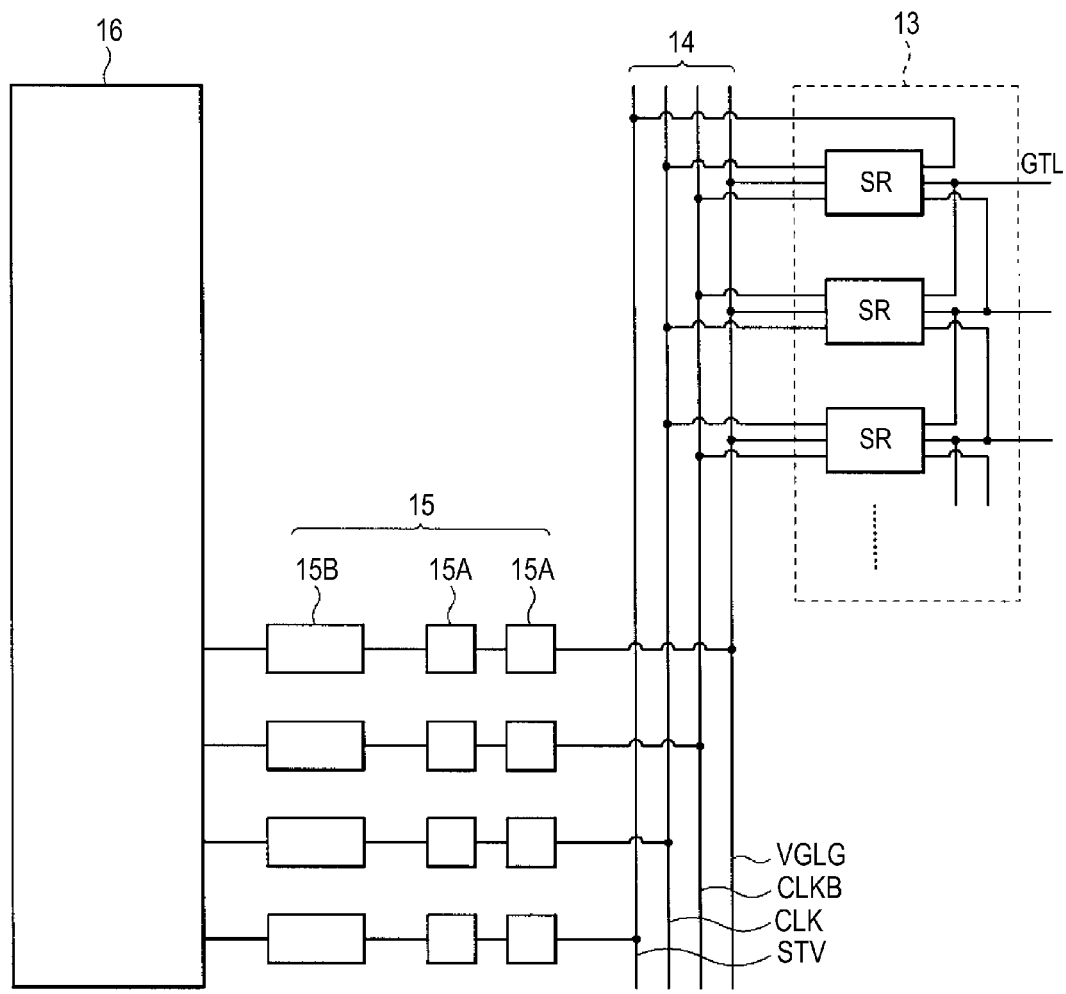
FIG. 7 is a diagram showing another example of the configuration example of the electrostatic protection circuit of FIG. 1 and the periphery thereof.

The example in which the electrostatic protection circuit 15 includes two diodes 15A and 15B has been cited in the above embodiment, however, the electrostatic protection circuit 15 may include three or more diodes. For example, as shown in FIG. 7, the electrostatic protection circuit 15 includes two diodes 15A, 15A and one diode 15B. In this case, it is preferable that the two diodes 15A and 15A are arranged near the control signal line 14 in relation to the diode 15B. It is also preferable that plural diodes included in the electrostatic protection circuit 15 are three or more diodes formed by TFTs having TFT channel lengths different from one another, though not shown. However, the TFT channel length of the diode positioned near the common potential electrode 16 is preferably longer than the TFT channel length of the diode positioned near the control signal line 14.

Figure 8:
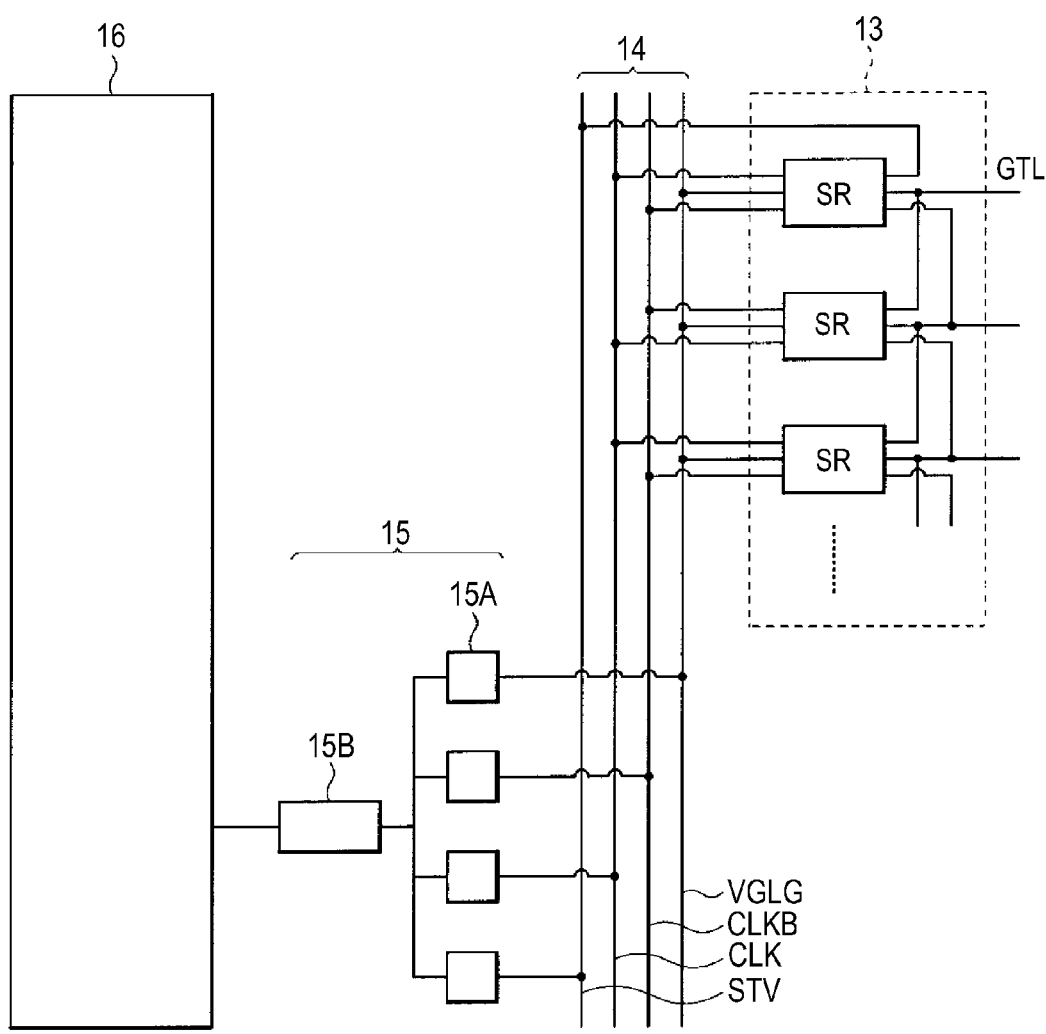
FIG. 8 is a diagram showing a further example of the configuration example of the electrostatic protection circuit of FIG. 1 and the periphery thereof.

Also in the above embodiment, the two diodes 15A and 15B are separately provided for every wiring line included in the control signal line 14, however, the diode 15B may be used in common in at least two wiring lines included in the control signal line 14. For example, as shown in FIG. 8, the diode 15B can be used in common in all wiring lines included in the control signal line 14. In this case, the diode 15B is connected in series to the diodes 15A provided separately for every wiring lines included in the control signal line 14. When the diode 15B is connected in series to the diodes 15A provided separately for every wiring lines included in the control signal line 14, one diode 15A may be provided for every wiring line included in the control signal line 14 as well as plural diodes 15A may be provided for every wiring line. That is, plural diodes to be included in the electrostatic protection circuit 15 may be configured by plural diodes 15A in which one or plural diodes 15A are provided for every wiring line included in the control signal line 14 and a diode 15B connected in series to the one or plural diodes 15A.

3. Application Examples

Hereinafter, application examples of the display device 1 explained in the above embodiment and the modification example thereof will be explained. The display device 1 according to the embodiment and so on can be applied to display devices of various fields of electronic apparatuses which displays video signals inputted from the outside or video signals generated inside as images or video, which are for example, a television apparatus, a digital camera, a notebook personal computer, portable terminal devices such as a cellular phone and a video camera.

First Application Example

Figure 9:
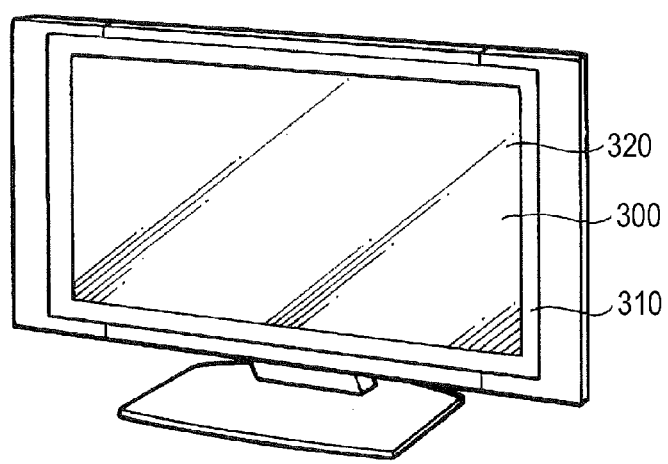
FIG. 9 is a perspective view showing an appearance of a first application example of the display device.

FIG. 9 shows an appearance of a television apparatus to which the display device 1 according to the embodiment and so on. The television apparatus has, for example, a video display screen unit 300 including a front panel 310 and a filter glass 320, in which the video display screen unit 300 is formed by the display device 1 according to the embodiment and so on.

Second Application Example

Figure 10A:
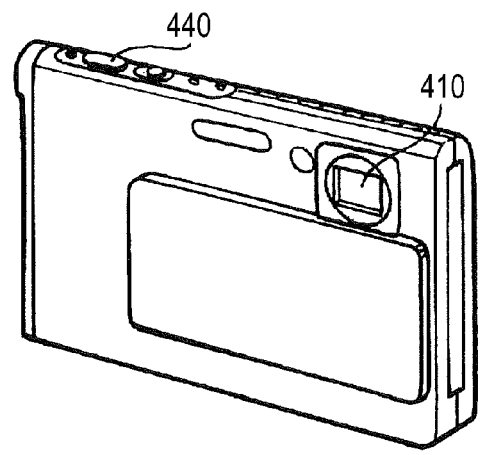
FIG. 10A is a perspective view showing an appearance of a second application example seen from the front and FIG. 10B is a perspective view showing an appearance seen from the back.
Figure 10B:
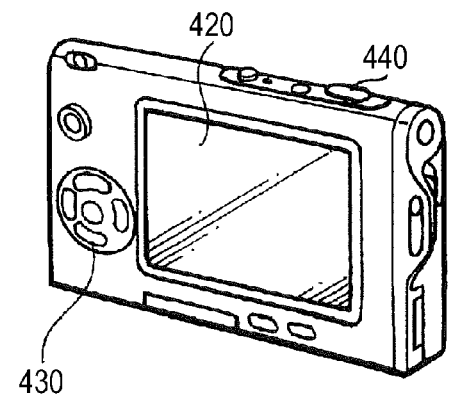

FIGS. 10A and 10B show an appearance of a digital camera to which the display device 1 according to the embodiment and so on is applied. The digital camera includes a light emitting unit 410 for a flash, a display unit 42, a menu switch 430 and a shutter button 440, in which the display unit 420 is formed by the display device 1 according to the embodiment and so on.

Third Application Example

Figure 11:
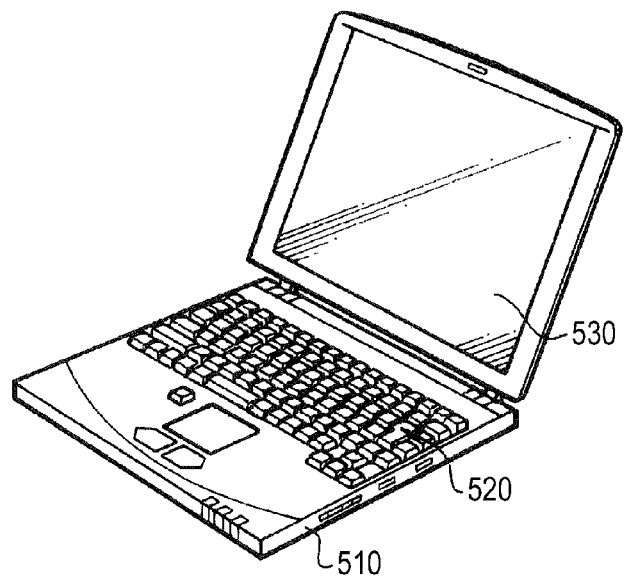
FIG. 11 is a perspective view showing an appearance of a third application example.

FIG. 11 shows an appearance of a notebook personal computer to which the display device 1 according to the embodiment is applied. The notebook personal computer includes, for example, a main body 510, a keyboard 520 for input operation of characters and the like and a display unit 530 displaying images, in which the display unit 530 is formed by the display device 1 according to the embodiment and so on.

Fourth Application Example

Figure 12:
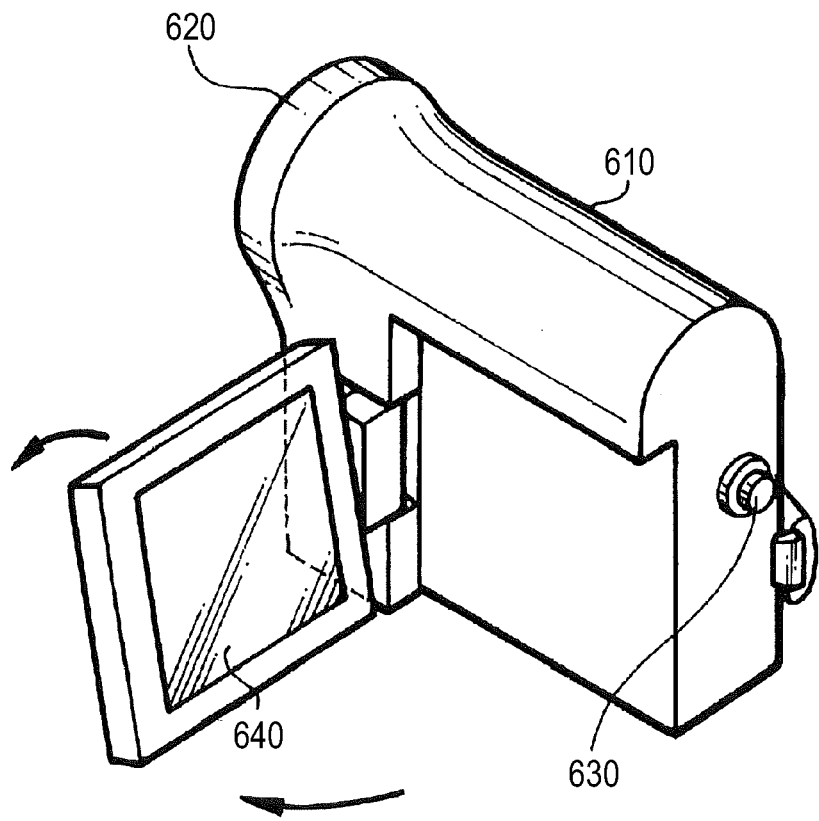
FIG. 12 is a perspective view showing an appearance of a fourth application example.

FIG. 12 shows an appearance of a video camera to which the display device 1 according to the embodiment and the like is applied. The video camera includes, for example, a main body 610, a lens 620 for object imaging provided on a front side surface of the main body 610, a start/stop switch 630 at the time of imaging and a display unit 640, in which the display unit 640 is formed by the display device 1 according to the embodiment and so on.

Fifth Application Example

FIGS. 13A to 13G show an appearance of a cellular phone device to which the display device according to the embodiment and so on is applied. The cellular phone device includes, for example, an upper casing 710 and a lower casing 720 connected by a connecting portion (hinge portion) 730, a display 740, a sub-display 750, a picture light 760 and a camera 770, in which the display 740 or the sub-display 750 is formed by the display device 1 according to the embodiment and so on.

For example, the present disclosure may be implemented in the following configurations.

(1) An electro-optic device including
a pixel area having plural pixels, and
a frame area formed in a periphery of the pixel area, on an insulating substrate,
in which the frame area includes
a drive circuit driving the pixels,
a control signal line to which control signals controlling the drive circuit are applied,
a common potential electrode having the same potential as a common potential applied to every pixels in common, and
an electrostatic protection circuit protecting the drive circuit, and
the electrostatic protection circuit includes plural diodes connected in series to each other between the control signal line and the common potential electrode as well as formed by thin-film transistors.

(2) The electro-optic device described in the above (1),
in which the plural diodes are configured so that a TFT channel length of a diode positioned near the common potential electrode is longer than a TFT channel length of a diode positioned near the control signal line.

(3) The electro-optic device described in the above (1) or (2),
in which the drive circuit is a scanning circuit performing selective scanning of every pixels in units of pixel rows, and
the signal control line includes plural wiring lines to which various types of control signals necessary for the selective scanning are applied.

(4) The electro-optic device described in the above (3),
in which the plural diodes are provided separately for every wiring line.

(5) The electro-optic device described in the above (3),
in which the plural diodes include one or plural first diodes provided for every wiring line, and a second diode provided in series to the one or plural first diodes.

(6) A display device including
an electro-optic device as a display panel,
in which the electro-optic device has
a pixel area having plural pixels, and
a frame area formed in a periphery of the pixel area, on an insulating substrate, and
in which the frame area includes
a drive circuit driving the pixels,
a control signal line to which control signals controlling the drive circuit are applied,
a common potential electrode having the same potential as a common potential applied to every pixels in common, and
an electrostatic protection circuit protecting the drive circuit, and
the electrostatic protection circuit includes plural diodes connected in series to each other between the control signal line and the common potential electrode as well as formed by thin-film transistors.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An electro-optic device comprising:
a pixel area having plural pixels; and
a frame area formed in a periphery of the pixel area, on an insulating substrate,
wherein the frame area includes
a drive circuit driving the pixels,
a control signal line to which control signals controlling the drive circuit are applied, a common potential electrode having the same potential as a common potential applied to every pixels in common, and an electrostatic protection circuit protecting the drive circuit, the electrostatic protection circuit includes plural diodes, formed by thin-film transistors (TFT), the control signal line, a first diode of the plural diodes, a second diode of the plural diodes and the common potential electrode are connected in this order in series, each of the first diode and the second diode including a first thin-film transistor and a second thin-film transistor, the first thin-film transistor and the second thin-film transistor being connected in parallel in which one of a source and a drain of the first thin-film transistor positioned near the control signal line is electrically connected to a gate of the first thin-film transistor and the other of the first thin-film transistor positioned near the common potential electrode is electrically connected to a gate of the second thin-film transistor, and the plural diodes are configured so that a TFT channel length of a diode positioned near the common potential electrode is longer than a TFT channel length of a diode positioned near the control signal line.

2. The electro-optic device according to claim 1, wherein the drive circuit is a scanning circuit performing selective scanning of every pixels in units of pixel rows, and the signal control line includes plural wiring lines to which various types of control signals necessary for the selective scanning are applied.

3. The electro-optic device according to claim 2, wherein the plural diodes are provided separately for every wiring line.

4. The electro-optic device according to claim 2, wherein the plural diodes include one or plural first diodes provided for every wiring line, and a second diode provided in series to the one or plural first diodes.

5. A display device comprising:

an electro-optic device as a display panel, wherein the electro-optic device has a pixel area having plural pixels, and a frame area formed in a periphery of the pixel area, on an insulating substrate, in which the frame area includes a drive circuit driving the pixels, a control signal line to which control signals controlling the drive circuit are applied, a common potential electrode having the same potential as a common potential applied to every pixels in common, and an electrostatic protection circuit protecting the drive circuit, the electrostatic protection circuit includes plural diodes formed by thin-film transistors (TFT), the control signal line, a first diode of the plural diodes, a second diode of the plural diodes and the common potential electrode are connected in this order in series, each of the first diode and the second diode including a first thin-film transistor and a second thin-film transistor, the first thin-film transistor and the second thin-film transistor being connected in parallel in which one of a source and a drain of the first thin-film transistor positioned near the control signal line is electrically connected to a gate of the first thin-film transistor and the other of the first thin-film transistor positioned near the common potential electrode is electrically connected to a gate of the second thin-film transistor, and the plural diodes are configured so that a TFT channel length of a diode positioned near the common potential electrode is longer than a TFT channel length of a diode positioned near the control signal line.

* * * * *